(12) United States Patent
Zhou et al.

(10) Patent No.: US 6,735,165 B1
(45) Date of Patent: May 11, 2004

(54) REWRITABLE OPTICAL INFORMATION MEDIUM

(75) Inventors: Guo-Fu Zhou, Eindhoven (NL); Roel Van Woudenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 447 days.

(21) Appl. No.: 09/332,240

(22) Filed: Jun. 14, 1999

(30) Foreign Application Priority Data

Jun. 22, 1998 (EP) .............................. 98202073

(51) Int. Cl.$^7$ .............................. G11B 7/24; B23B 3/00
(52) U.S. Cl. .............................. 369/275.2; 369/275.4; 369/283; 428/64.4
(58) Field of Search .............................. 369/275.2, 275.1, 369/275.4, 13, 283, 288, 116, 59.12, 53.3, 59.11, 275.5, 13.03, 275.3; 428/64.1, 64.4, 64.5, 64.2; 430/270.13, 495.1

(56) References Cited

U.S. PATENT DOCUMENTS 5,876,822 A  *  3/1999 Zhou et al. .............. 428/64.1
5,935,672 A  *  8/1999 Zhou et al. .............. 428/64.1

FOREIGN PATENT DOCUMENTS

JP         3216827 A   *   9/1991
WO         WO9750084   *   12/1997

* cited by examiner

*Primary Examiner*—Ali Neyzari
(74) *Attorney, Agent, or Firm*—Ernestine C. Bartlett

(57) ABSTRACT

A description is given of a disc-shaped rewritable optical information medium having an IPIM stack (2) comprising a phase-change recording layer (4) sandwiched between two dielectric layers (3,5), and a metal mirror layer (6). The thickness of the recording layer (4) increases gradually with increasing radius r. As a result, the complete erasure time CET of recorded marks decreases from the inner radius $r_i$ to the outer radius $r_o$. Therefore, at a point closer to the outer radius marks can be recorded at a higher linear speed than at a point closer to the inner radius. This effect ensures that the recording medium can be used for recording at a constant angular velocity (CAV).

8 Claims, 1 Drawing Sheet

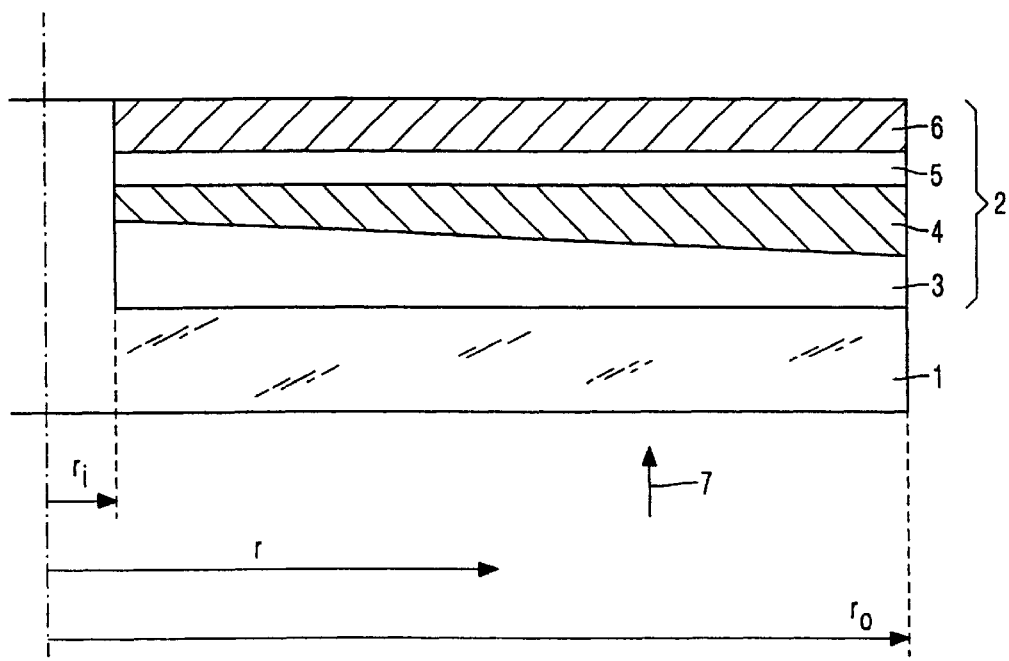

REWRITABLE OPTICAL INFORMATION MEDIUM

BACKGROUND OF THE INVENTION

The invention relates to an optical information medium for rewritable recording at constant angular velocity by means of a laser-light beam, said medium comprising a disc-shaped substrate carrying a stack of layers, which stack comprises in this order:

a first dielectric layer, a recording layer of a phase-change material which is able to record amorphous marks when in the crystalline state, the recording layer forming an annular recording area with an inner and an outer radius, a second dielectric layer, and a metal mirror layer.

The invention also relates to the use of such an optical recording medium for recording at constant angular velocity.

Optical information or data storage based on the phase-change principle is attractive, because it combines the possibilities of direct overwrite (DOW) and high storage density with easy compatibility with read-only systems. Phase-change optical recording involves the formation of submicrometer-sized amorphous recording marks in a thin crystalline film using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks with respect to the crystalline recording layer bring about a modulated laser-light beam which is subsequently converted by a detector into a modulated photocurrent in accordance with the coded, recorded digital information.

One of the problems in phase-change optical recording is to obtain a high erasing (recrystallization) speed. A high crystallization speed is particularly required in high-density recording and high data rate applications, such as disc-shaped DVD-RAM, DVD-Rewritable systems and DVR (Digital Video Recorder). If the crystallization speed is not high enough to match the linear velocity of the medium relative to the laser-light beam, the old data (amorphous marks) of the previous recording can not be completely removed (recrystallized) during DOW, causing a high noise level. For example, to successfully perform recording on a DVD-RAM disc at a constant recording speed of 7.2 m/s (i.e six times the speed according to the Compact Disc standard), the complete erasure time (CET) of the phase change recording layer should be 60 ns or shorter. The recording speed is the magnitude of the velocity between the recording layer of the recording medium and a spot formed by the laser-light beam on this recording layer. When recording data on a recording medium, the recording speed may change as a function of the position of the spot of the laser-light beam on the recording layer. Changes in recording speed are encountered when recording on a disc-shaped recording medium rotating at a constant angular velocity (CAV). Phase-change optical recording at CAV is especially important in computer and video applications. The access time from the outer radius to the inner radius is much shorter in CAV-recording than in constant linear velocity (CLV) recording, because in CLV-recording the rotational speed of the medium must be increased when the radial position of the spot of the laser-light beam on the recording layer is decreased. This adaptation of the rotational speed to the radial position is relatively slow due to the inertia of the medium.

When the recording is performed on a disc rotating at a constant angular velocity, the linear velocity decreases with decreasing radius. For example, in the case of a 120 mm disc rotating at a frequency of 20 Hz (DVD-RAM format B' or DVD+RW 3.0), the linear velocity at the outer radius is about 7.3 m/s (at radius r=58 mm) and at the inner radius about 3 m/s (r=24 m/s). At such linear velocities, the CET of the recording layer should be 60 ns or shorter, so that the recording can be successfully performed at the outer radius where the linear velocity is highest. However, when the recording is performed at the inner radius of the disc (at the same rotating frequency), recrystallization occurs during DOW because of the high crystallization rate and the relatively low linear velocity. This leads to badly defined mark edges and thus a high jitter, a large increase of amorphous reflection and a decrease of modulation.

An optical information medium of the type mentioned in the opening paragraph is known from the international patent application WO 97/50084 (PHN 15881) (U.S. Application 08/795,819 now U.S. Pat. No. 5,876,822) filed by Applicants. The known medium of the phase-change type has a substrate carrying a stack of layers comprising a phase-change recording layer of a GeSbTe-compound sandwiched between two dielectric layers, and a metal mirror layer as a reflective layer. Such a stack of layers can be referred to as an IPIM-structure, wherein I represents a dielectric layer, P represents a phase-change recording layer, and M represents a metal mirror layer. With certain GeSbTe compounds and a well defined layer thickness of the recording layer and the second dielectric layer, CET-values of about 50–60 ns are obtained. The layer thicknesses are optimized for a constant linear velocity of 7.2 m/s. When such a recording is used at CAV, due to the difference in linear velocity over the radius of the disc, the above mentioned problems occur.

SUMMARY OF THE INVENTION

It is an object of the invention to provide, inter alia, a rewritable optical information medium which is suitable for recording at constant angular velocity (CAV), such as DVD-RAM and DVR, and which is suitable for high data rate and high density optical recording.

This object is achieved in accordance with the invention by an optical information medium as described in the opening paragraph, characterized in that the recording layer has a gradually increasing thickness from the inner to the outer radius. It is known from the above mentioned WO 97/50084 that the CET-value of GeSbTe-compounds decreases with increasing layer thickness. Some of these materials, such as $GeSb_2Te_4$, show an almost linear decrease of the CET at an increase in layer thickness from 15 to 27 nm. In this thickness range the CET decreases by a factor of 3. The slope of the decrease depends on the composition of the GeSbTe-compound. Since the linear velocity difference between the outer and inner radius is of a similar order of magnitude as the CET difference, discs with a variable thickness of the phase change recording layer are suitable for CAV-recording, when the thickness of the recording layer at the inner radius is smaller than at the outer radius. When the thickness of the recording layer gradually increases from the inner to the outer radius, the increase in linear velocity between the spot of the laser-light beam and the recording layer can be met by an appropriate decrease in the CET, i.e. a faster crystallization rate of the recording layer.

The choice of the thickness range of the recording layer is determined by the CET vs thickness curve and the linear velocity difference between the inner and outer radius. If the CET vs thickness curve is (almost) linear, as for the compound $GeSb_2Te_4$ in the thickness range between 15 to 27 nm, the thickness of the recording layer increases (almost) linearly from the inner radius to the outer radius.

The recording layer comprises a phase-change material showing a crystalline-amorphous phase transition. Known materials are e.g. alloys of In—Se, In—Se—Sb, In—Sb—Te, Te—Ge, Te—Se—Sb, and Te—Ge—Se. Preferably, the recording layer comprises a GeSbTe-compound. Especially useful are the compounds described in the above mentioned patent application WO 97/50084. These compounds have a composition defined in atomic percentages by the formula: $Ge_{50x}Sb_{40-40x}Te_{60-10x}$, wherein $0.166 \leq x \leq 0.444$. These compositions are situated on the line connecting the compounds GeTe and $Sb_2Te_3$ in the triangular Ge—Sb—Te composition diagram, and include the stoichiometric compounds $Ge_2Sb_2Te_5$ (x=0.445), $GeSb_2Te_4$ (x=0.286) and $GeSb_4Te_7$ (x=0.166). These compounds show a small CET-value.

Other preferred compounds are described in the non-prepublished European patent application with application number 97203459.9 (PHN 16586) (U.S. Application Ser. No. 09/184,529 now U.S. Pat. No. 6,127,049 filed by Applicants. These compounds have a composition defined by an area in the ternary composition diagram Ge—Sb—Te in atomic percentages, said area being of pentagonal shape having the following vertices:

$Ge_{14.2}Sb_{25.8}Te_{60.0}$ (P)

$Ge_{12.7}Sb_{27.3}Te_{60.0}$ (Q)

$Ge_{13.4}Sb_{29.2}Te_{57.4}$ (R)

$Ge_{15.1}Sb_{27.8}Te_{57.1}$ (S)

$Ge_{13.2}Sb_{26.4}Te_{60.4}$ (T);

With these compounds CET-values below 50 ns can be achieved.

Other preferred compounds have a composition:

$(GeSb_2Te_4)_{1-x}Te_x$ wherein the molar fraction x satisfies: $0.01 \leq x \leq 0.37$. These compositions are situated on the tieline connecting $GeSb_2Te_4$ and Te in the ternary composition diagram, but within the pentagonal area PQRST. With these compounds CET-values of lower than 45 ns can be obtained.

When up to 3.5 at.% oxygen is added to the above-mentioned Ge—Sb—Te compounds, even lower CET-values are obtained.

The crystallization speed or CET-value of the above mentioned GeSbTe-compounds and other phase-change materials depends on the layer thickness of the recording layer. The CET decreases rapidly as the layer thickness increases up to 10 nm. Between 15 and 27 nm the CET decreases (almost) linearly with the thickness. When the recording layer is thicker than 27 nm, the CET is essentially independent of thickness. Above 35 nm the cyclability of the medium is adversely affected. The cyclability of the medium is measured by the relative change of the optical contrast C after a large number of DOW-cycles, e.g $10^5$. In every cycle the written amorphous bits are erased by recrystallizing through heating with a laser-light beam while the new amorphous marks are written. In the ideal case, the optical contrast C remains unchanged after cycling. The cyclability is practically constant up to a layer thickness of the recording layer of 35 nm.

The first and second dielectric layers can be made of a mixture of ZnS and $SiO_2$, e.g. $(ZnS)_{80}(SiO_2)_{20}$. The layers may also be made of $SiO_2$, $TiO_2$, ZnS, $Si_3N_4$, AlN and $Ta_2O_5$. Preferably, a carbide is used, like SiC, WC, TaC, ZrC or TiC. These materials give a higher crystallization speed and better cyclability than a ZnS—$SiO_2$ mixture.

For the metal mirror layer, metals such as Al, Ti, Au, Ni, Cu, Ag, Rh, Pt, Pd, Ni, Co, Mn and Cr, and alloys of these metals, can be used. Examples of suitable alloys are AlTi, AlCr and AlTa.

The thickness of the first dielectric layer (between substrate and recording layer) is preferably between 70 and $[70+\lambda/(2n)]$ nm, wherein $\lambda$ is the wavelength of the laser-light beam, and n is the refractive index of the dielectric layer. If the thickness is smaller than 70 nm, the cyclability is reduced considerably. A thickness above $70+\lambda/(2n)$ nm does not lead to a further increase of the cyclability, adversely affects the optical contrast C, and is more expensive to make. If for example the wavelength is equal to 630 nm and the refractive index is 1.5, the thickness range extends from 70 nm to 280 nm.

In a preferential embodiment, the thickness of the first dielectric layer decreases gradually front the inner to the outer radius, so that the top reflection and modulation remain essentially constant from the inner to the outer radius.

An optimal thickness range for the second dielectric layer, i.e. the layer between the recording layer and the metal mirror layer is found between 15 and 50 nm, preferably between 20 and 40 nm. When this layer is too thin, the thermal insulation between the recording layer and the metal mirror layer becomes worse. As a result the cooling rate of the recording layer is increased, which causes a slow crystallization process and a poor cyclability. The cooling rate will decrease with increasing the thickness of the second dielectric layer.

The thickness of the metal mirror layer is preferably between 60 and 160 nm. The cyclability is adversely affected when the metal mirror layer is thinner than 60 nm, because the cooling rate is too slow. When the metal mirror layer is 160 nm or thicker, the cyclability deteriorates, and the recording and erasing power must be high because of the increased thermal conduction. The optimal thickness of the metal mirror layer is between 80 and 120 nm.

A further refinement of the medium according to the invention is characterized in that carbide layers are inserted between the recording layer and the first and second dielectric layers. The carbide layers are arranged on both sides of the recording layer. The stack obtained has the structure $II^+PI^+IM$, wherein $I^+$ represents a carbide or nitride layer. These additional carbide or nitride layers improve the cyclability and the crystallization speed of the recording layer. The thickness of the carbide or nitride layers is preferably between 2 and 8 nm. The relatively high thermal conductivity of the carbide or nitride will only have a small effect on the stack when this thickness is small, thereby facilitating the thermal design of the stack. The carbide of the carbide layers is preferably a member of the group consisting of SiC, ZrC, TaC, Tic and WC, which combine an excellent cyclability with a short crystallization time. SiC is a preferred material because of its optical, mechanical and thermal properties; moreover, its price is relatively low. $Si_3N_4$ and GeN are preferred nitrides.

In a particular embodiment, the stack is extended with a light-absorbing layer A, which results in a structure IPIAIM or $II^+PI^+AIM$. Such a light-absorbing layer reduces the difference in light-absorption between the amorphous and the crystalline state of the recording layer. As a result, the recording marks overwritten in a crystalline area have the same size as those in an amorphous area. This effect will reduce jitter; the storage density of such a recording medium can be considerably enhanced. Another advantage is that the optical phase difference between the crystalline and the amorphous state can be made substantially zero, which is preferable for land-groove recording. The material of the light-absorbing layer A has a n/k ratio in the range between 0.5 and 20, preferably 0.6 and 16. The complex refractive index $\tilde{n}=n+ik$. These values give a proper balance between light absorption and transmission. Examples of materials which satisfy these conditions are metals selected from the group consisting of Mo, W, Pd, Pt, Co, Ni, Mn, Ta, Cr, Ti and Hf, and semiconducting materials selected from the group consisting of PbS, Ge, InP and Si. Preferred are Si and Ge, because they are cheap and easy to apply. Metals like Au, Cu, Al and Rh do not satisfy this condition, because their n/k value is outside the range. The thickness of the light-absorbing layer A is preferably between 2 and 200 nm, more preferably between 10 and 100 nm, in order to have a proper balance between light absorption and transmission, and depends on the n/k ratio of the material chosen. For example for Si the thickness is about 75 nm, for Mo the thickness is about 35 nm, and for Ge the thickness is about 55 nm.

In an alternative embodiment, the stacks have a structure mIPIM, $mII^+PI^+IM$, $mII^+PI^+IAI$ or $mII^+PI^+IAIM$, wherein I, $I^+$, P A and M have the above-mentioned meaning and wherein m is a thin transparent metal layer of e.g. Au.

Both the reflective mirror layer, the light-absorptive layer, the carbide or nitride layers and the dielectric layers can be provided by vapour deposition or sputtering.

The phase change recording layer can be applied to the substrate by vacuum deposition, electron beam vacuum deposition, chemical vapour deposition, ion plating or sputtering. The layer as deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the GeSbTe-compound, e.g. 180° C. When a synthetic resin substrate is used, such as polycarbonate, the recording layer can alternatively be heated by a laser-light beam of sufficient power. This can be realized, e.g. in a recorder, in which case the laser-light beam scans the moving recording layer. The amorphous layer is then locally heated to the temperature required for crystallizing the layer, without the substrate being subjected to a disadvantageous heat load.

The substrate of the information medium is at least transparent to the laser wavelength, and is made, for example, of polycarbonate, polymethyl methacrylate (PMMA), amorphous polyolefin or glass. In a typical example, the disc-shaped substrate has a diameter of 120 mm and a thickness of 0.1, 0.6 or 1.2 mm. When a substrate of 0.6 or 1.2 mm is used, the layers can be applied on this substrate starting with the first dielectric layer, recording layer, etc. The laser-light beam enters the stack via the entrance face of the substrate. The layers of the stack on the substrate may also be applied in the reversed order, i.e. starting with the metal mirror layer. The last dielectric layer is then provided with a transparent layer of one of the above mentioned substrate materials with a thickness of 0.1mm. The laser-light beam enters the stack via the entrance face of this transparent layer.

The surface of the disc-shaped substrate on the side of the recording layer is, preferably, provided with a servotrack which can be scanned optically. This servotrack is often constituted by concentric or spiral shaped grooves. The groove can be formed in the substrate by means of a mould during injection moulding or pressing. The groove can be alternatively formed in a replication process in a synthetic resin layer, for example, a UV light-cured layer of acrylate, which is separately provided on the substrate. In high-density recording such a groove has a pitch e.g. of 0.6–1.2 $\mu$m and a width of about half the pitch.

Optionally, the outermost layer of the stack is screened from the environment by means of a protective layer of, for example, UV light-cured poly(meth)acrylate.

High-density recording and erasing can be achieved by using a short-wavelength laser, e.g. with a wavelength of 670 nm or shorter (red to blue).

It is noted that the abstract of the Japanese patent application JP-A-3-216827 discloses an optical recording medium in which the thickness of the recording layer decreases from the inner to the outer radius, i.e. opposite to the recording layer thickness increase according to the present invention. This patent application relates to a different problem: the thickness reduction in the radial direction allows for recording at a constant power when the medium rotates at a constant angular velocity.

BRIEF DESCRIPTION OF THE DRAWINGS

In the drawing the solo FIGURE is a schematic cross-sectional view of an optical information medium in accordance with the invention.

DETAILED DESCRIPTION OF THE INVENTION

The invention will now be described in greater detail with reference to the FIGURE of the drawing.

Exemplary Embodiment

The FIGURE of the drawing schematically shows a part of a cross-section of an optical information disc in accordance with the invention. Reference numeral 1 denotes a polycarbonate disc-shaped substrate having a diameter of 120 mm and a thickness of 0.6 mm. The substrate 1 is provided with an IPIM stack 2 of the following structure:

a first dielectric layer 3 of $(ZnS)_{80}(SiO_2)_{20}$ with a linearly decreasing thickness in the radial direction r from 120 nm (at inner radius $r_i$) to 92.4 nm (at outer radius $r_o$), a recording layer 4 of the phase-change compound with the composition $Ge_{14.05}Sb_{28.15}Te_{57.80}$ (in atomic percentages), which is close to the stoichiometric compound $GeSb_2Te_4$ ($Ge_{14.3}Sb_{28.6}Te_{57.1}$), with a linearly increasing thickness in the radial direction r from 15 nm (at inner radius $r_i$) to 27 nm (at outer radius $r_o$), a second dielectric layer 5 of $(ZnS)_{80}(SiO_2)_{20}$ with a thickness of 25 nm, a metal mirror layer 6 of Al with a thickness of 100 nm.

The recording layer 4 forms an angular recording area enclosed between the radii $r_i$ and $r_o$.

The stack 2 is covered with a protective coating (not shown) of UV-cured polyacrylate.

The substrate 1 is provided on one side with a spiral tracking guide groove (not shown) by means of UV-light curing a layer of acrylate in a replication process.

All the layers, except the protective coating, are provided by sputtering. The variation in layer thickness in the radial direction is obtained by inserting a diaphragm with a varying opening during sputtering between the substrate and the sputter target.

The initial crystalline state of the recording layer 4 is obtained by heating the as-deposited amorphous alloy with a focused laser beam in a recorder.

A laser-light beam with a wavelength of 670 nm for recording, reproducing and erasing of information enters stack 2 via the substrate 1. This beam is schematically represented by arrow 7. The amorphous marks are written with one or more laser pulses of power $P_w=1.25\ P_m$ ($P_m$=melting threshold power) and duration 100 ns. The erase power is $P_w/2$.

The Table below shows the results. The first column represents the radius r of the recording layer. The second column gives the thickness $d_3$ of the first dielectric layer 3. The third column gives the thickness $d_4$ of the recording layer 4. The fourth and fifth column give the reflectivities of the amorphous and crystalline phase, respectively. The sixth column gives the optical contrast C, which is defined as: $100(R_c-R_a)/R_c$. The seventh column gives the CET of the recording layer. The CET is defined as the minimum duration of the erasure pulse for complete crystallization of a written amorphous mark in a crystalline environment, which is measured statically.

TABLE

| r (mm) | $d_3$I (nm) | $d_4$P (nm) | $R_a$ (%) | $R_c$ (%) | C (%) | CET (ns) |
|---|---|---|---|---|---|---|
| 24 | 120 | 15 | 3.9 | 22.7 | 82.7 | 54 |
| 38 | 108 | 20 | 4.0 | 23.1 | 82.8 | 48 |
| 52 | 97 | 25 | 5.5 | 22.4 | 75.4 | 42 |
| 58 | 92 | 27 | 6.3 | 21.9 | 71.2 | 39 |

The Table shows that with increasing radial distance r from the center of the disc, the CET of the recording layer decreases (i.e. a higher crystallization rate), which meets the increase of the linear velocity of the recording layer in said radial direction. The Table also shows that the stack satisfies the optical property requirements, i.e. a high crystalline reflection and a good contrast. The maximum variation of the crystalline reflection is limited to less than 5% in a relatively large recording layer thickness range from 15 to 27 nm.

According to the invention a disc-shaped rewritable phase change optical information medium with an IPIM stack is provided, such as for DVD-RAM, DVD-ReWritable, or DVR, which is suitable for recording at constant angular velocity (CAV).

What is claimed is:

1. An optical information medium for rewritable recording at constant angular velocity by means of a laser-light beam, said medium comprising a disc-shaped substrate carrying a stack of layers, which stack comprises in this order:

a first dielectric layer, a recording layer of a phase-change material which is able to record amorphous marks when in the crystalline state, the recording layer forming an annular recording area with an inner and an outer radius, a second dielectric layer, a metal mirror layer, characterized in that the recording layer has a gradually increasing thickness from the inner to the outer radius.

2. An optical information medium as claimed in claim 1, characterized in that the recording layer comprises a GeSbTe compound.

3. An optical information medium as claimed in claim 1, characterized in that the thickness of the recording layer ranges between 10 and 35 nm, preferably between 15 and 27 nm.

4. An optical information medium as claimed in claim 1, characterized in that the thickness of the first dielectric layer is between 70 and $[70+\lambda/(2n)]$ nm, wherein $\lambda$ is the wavelength of the laser-light beam, and n is the refractive index of the dielectric layer.

5. An optical information medium as claimed in claim 1, characterized in that the thickness of the first dielectric layer gradually decreases from the inner radius to the outer radius.

6. An optical information medium as claimed in claim 1, characterized in that the thickness of the second dielectric layer is between 15 and 50 nm.

7. An optical information medium as claimed in claim 1, characterized in that the thickness of the metal mirror layer is between 60 and 160 nm.

8. An optical information medium as claimed in claim 1, characterized in that carbide layers are inserted between the recording layer and the first and second dielectric layers.

* * * * *